(12) United States Patent
Clark

(10) Patent No.: US 10,542,582 B1
(45) Date of Patent: Jan. 21, 2020

(54) WIRELESS COMMUNICATION WITH ADAPTIVE RESPONSIVENESS

(71) Applicant: Honeywell International Inc., Morris Plains, NJ (US)

(72) Inventor: Henry Shaun Clark, Livingston (GB)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/202,073

(22) Filed: Nov. 27, 2018

(51) Int. Cl.
*H04W 4/38* (2018.01)
*H04W 76/28* (2018.01)
*H04W 4/21* (2018.01)
*H04L 12/28* (2006.01)

(52) U.S. Cl.
CPC .............. *H04W 76/28* (2018.02); *H04W 4/21* (2018.02); *H04L 12/2803* (2013.01)

(58) Field of Classification Search
CPC ... H04W 76/28; H04W 4/21; H04W 12/2803; H04W 4/38
USPC ........................................................ 455/517
See application file for complete search history.

(56) References Cited

U.S. PATENT DOCUMENTS

| | | | | |
|---|---|---|---|---|
| 8,867,421 B2* | 10/2014 | Hiremath | ............ | H04W 52/028 370/311 |
| 9,125,152 B2* | 9/2015 | Zhu | .................... | H04W 52/0229 |
| 9,565,633 B2* | 2/2017 | Samardzija | ....... | H04W 52/0229 |
| 9,641,553 B2* | 5/2017 | Ellis | ........................ | H04L 63/20 |
| 9,948,349 B2* | 4/2018 | Malach | ..................... | H04B 1/48 |
| 10,028,074 B2* | 7/2018 | MacKenzie | ....... | H04W 52/0216 |
| 10,110,272 B2* | 10/2018 | Barnett, Jr. | ............ | H04B 1/401 |
| 10,116,521 B2* | 10/2018 | Kokkula | ............... | H04L 41/145 |
| 10,148,502 B2* | 12/2018 | Idnani | ................. | H04L 41/0816 |
| 10,349,171 B2* | 7/2019 | Yoon | ........................ | G01S 5/30 |
| 2013/0044658 A1* | 2/2013 | Zhu | .................... | H04W 52/0229 370/311 |
| 2013/0272180 A1* | 10/2013 | Hiremath | ............ | H04W 52/028 370/311 |
| 2015/0006695 A1* | 1/2015 | Gupta | ..................... | H04L 41/32 709/223 |
| 2016/0007288 A1* | 1/2016 | Samardzija | ....... | H04W 52/0229 370/311 |
| 2016/0047855 A1* | 2/2016 | Bhunia | ............ | G01R 31/31858 324/763.01 |
| 2016/0057605 A1* | 2/2016 | Shellhammer | ........ | H04W 8/005 370/311 |
| 2016/0241439 A1* | 8/2016 | Idnani | ................. | H04L 41/0816 |

(Continued)

*Primary Examiner* — Hai V Nguyen
(74) *Attorney, Agent, or Firm* — Shumaker & Sieffert, P.A.

(57) ABSTRACT

The present disclosure generally relates to wireless devices, and more particularly, to battery powered wireless devices and methods of operating said devices using a scheduled communication time. A first device and a second device of a building control system may communicate wirelessly during scheduled communication times. The second device may enter a listening state during the scheduled communication times, and may enter a non-listening state between at least some of the scheduled communication times. A plurality of user inputs may cause a corresponding communication between the first device and the second device. The user inputs may identify active periods of a day that user input is more likely to occur, and inactive periods of the day that user input is less likely to occur. The second device may be maintained in the listening state more during active periods than during inactive periods.

20 Claims, 9 Drawing Sheets

(56) References Cited

U.S. PATENT DOCUMENTS

| | | | |
|---|---|---|---|
| 2017/0019144 A1* | 1/2017 | Malach | H04W 4/80 |
| 2017/0019853 A1* | 1/2017 | Ghosh | H04W 52/0216 |
| 2017/0026282 A1* | 1/2017 | Huang | H04L 45/122 |
| 2017/0093915 A1* | 3/2017 | Ellis | H04L 63/20 |
| 2017/0111233 A1* | 4/2017 | Kokkula | H04L 41/145 |
| 2017/0208531 A1* | 7/2017 | Huang | H04W 28/021 |
| 2017/0288933 A1* | 10/2017 | Mohamed | H04L 27/2697 |
| 2017/0302704 A1* | 10/2017 | Ellis | H04L 63/20 |
| 2017/0324443 A1* | 11/2017 | Turner | H04B 1/7156 |
| 2017/0345420 A1* | 11/2017 | Barnett, Jr. | G06F 3/167 |
| 2018/0048987 A1* | 2/2018 | Morris | H04W 4/50 |
| 2018/0049156 A1* | 2/2018 | Laha | H04W 4/06 |
| 2018/0054231 A1* | 2/2018 | Malach | H04W 4/80 |
| 2018/0062691 A1* | 3/2018 | Barnett, Jr. | H04B 1/401 |
| 2018/0091898 A1* | 3/2018 | Yoon | G01S 5/30 |
| 2018/0110046 A1* | 4/2018 | Patil | H04W 72/0446 |
| 2018/0159746 A1* | 6/2018 | Li | H04L 41/5016 |
| 2018/0284735 A1* | 10/2018 | Cella | G05B 23/024 |
| 2018/0285977 A1* | 10/2018 | Cleary | G06Q 40/08 |
| 2018/0295487 A1* | 10/2018 | MacKenzie | H04W 4/70 |
| 2018/0320609 A1* | 11/2018 | McQuillen | F01N 13/008 |
| 2019/0007902 A1* | 1/2019 | Khaled | H04W 56/0015 |
| 2019/0028134 A1* | 1/2019 | Barnett, Jr. | H04B 1/401 |
| 2019/0028357 A1* | 1/2019 | Kokkula | H04L 41/145 |
| 2019/0059053 A1* | 2/2019 | Qaderi | H04W 52/0216 |
| 2019/0116229 A1* | 4/2019 | Shi | H04W 76/34 |
| 2019/0141562 A1* | 5/2019 | Tyagi | H04L 41/0816 |
| 2019/0158385 A1* | 5/2019 | Patil | H04L 45/245 |
| 2019/0173751 A1* | 6/2019 | Idnani | H04L 41/0816 |
| 2019/0174207 A1* | 6/2019 | Cella | H04L 67/12 |
| 2019/0238536 A1* | 8/2019 | Chilla | H04L 9/3263 |

* cited by examiner

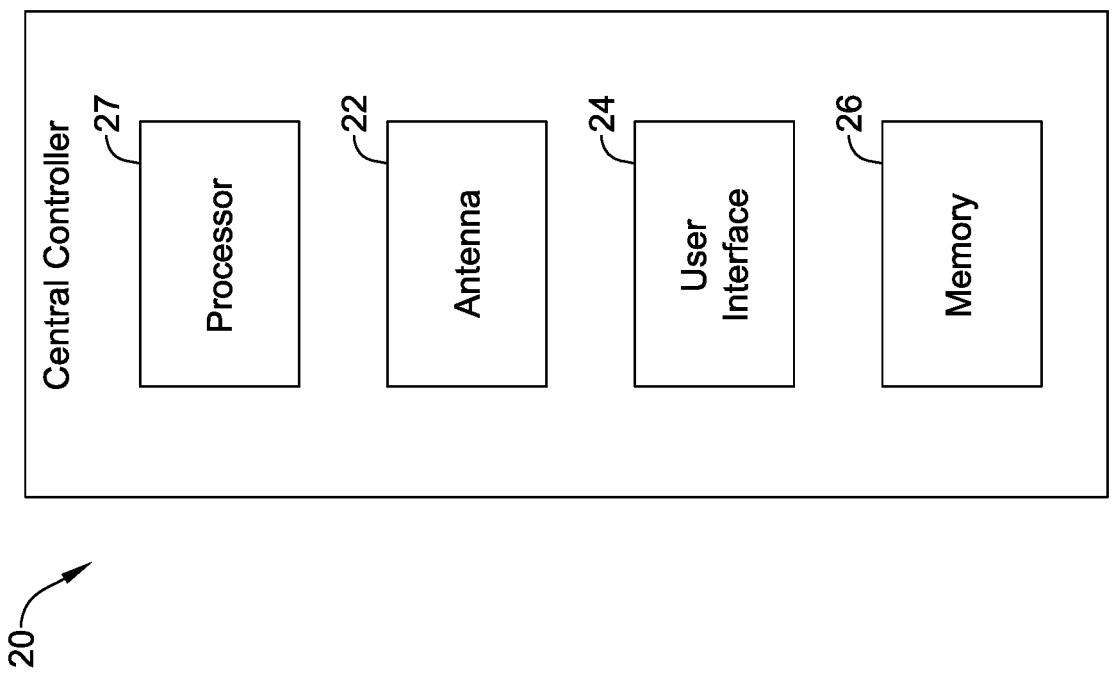

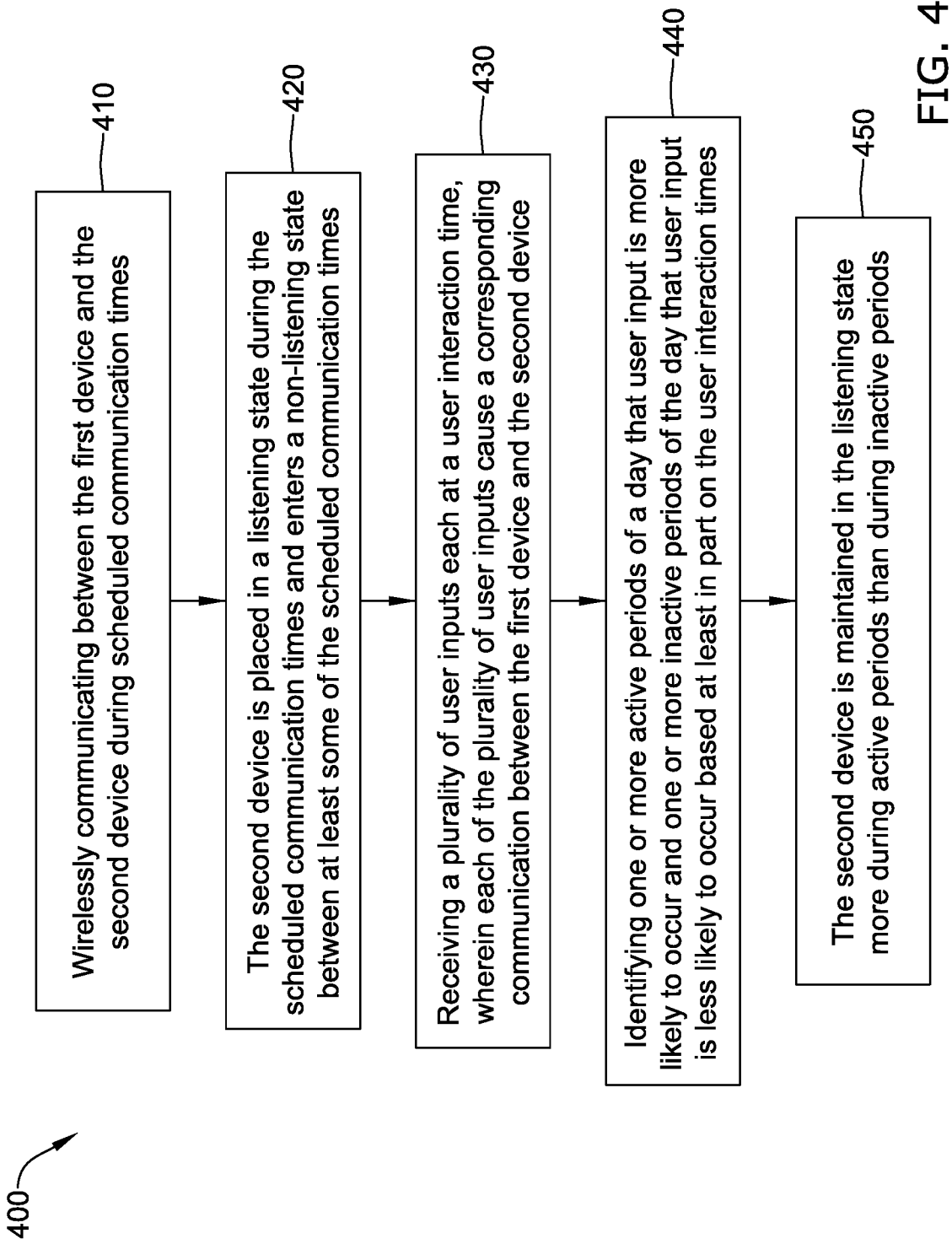

| | S | M | T | W | Th | F | S |
|---|---|---|---|---|---|---|---|
| 12:00 am-<br>2:59 am | Counter 0 | Counter 0 | Counter 0 | Counter 0 | Counter 0 | Counter 0 | Counter 0 |
| 3:00 am-<br>5:59 am | Counter 0 | Counter 7 | Counter 0 | Counter 7 | Counter 0 | Counter 7 | Counter 0 |
| 6:00 am-<br>8:59 am | Counter 7 | Counter 5 | Counter 2 | Counter 0 | Counter 1 | Counter 0 | Counter 0 |
| 9:00 am-<br>11:59 am | Counter 0 | Counter 0 | Counter 0 | Counter 0 | Counter 0 | Counter 0 | Counter 7 |
| 12:00 pm-<br>2:59 pm | Counter 0 | Counter 0 | Counter 0 | Counter 2 | Counter 0 | Counter 0 | Counter 0 |
| 3:00 pm-<br>5:59 pm | Counter 0 | Counter 0 | Counter 0 | Counter 0 | Counter 4 | Counter 0 | Counter 0 |
| 6:00 pm-<br>8:59 pm | Counter 5 | Counter 4 | Counter 0 | Counter 2 | Counter 0 | Counter 6 | Counter 7 |
| 9:00 pm-<br>11:59 pm | Counter 0 | Counter 0 | Counter 0 | Counter 0 | Counter 0 | Counter 0 | Counter 0 |

FIG. 5

|  | S | M | T | W | Th | F | S |
|---|---|---|---|---|---|---|---|
| 5:00 am-7:59 am | S / H | H | H | H | H | H | S / H |
| 8:00 am-11:59 am | H | W | W | W | W | W | H |
| 12:00 pm-4:59 pm | H | W | W | W | W | W | H |
| 5:00 pm-9:59 pm | H | H | H | H | H | H | H |
| 10:00 pm-4:59 am | S | S | S | S | S | S / H | S |

810 — H = 10sec
820 — W = 4 min
830 — S = 4 min

WIRELESS COMMUNICATION WITH ADAPTIVE RESPONSIVENESS

TECHNICAL FIELD

The disclosure relates generally to wireless devices, and more particularly, to battery powered wireless devices.

BACKGROUND

The use of wireless communication between devices is common today and is growing at a rapid pace. For example, many building control systems, as well as other system, use wireless communication to pass information and/or commands between devices of the system. For example, in building control systems, such as Heating, Ventilation and/or Air Conditioning (HVAC) systems, security systems, fire systems, lighting systems, and the like, building control devices (e.g. sensors, valves, actuators, etc.) often include wireless communication modules that support wireless communication with a central building controller or the like. This may eliminate the need to run wires between each of the devices and the central controller. With the advent of the Internet of Things (IoT), many standard appliances, as well as other devices, now incorporate wireless communication modules that support communication over a network.

In some cases, some of these wireless devices are battery powered. To achieve acceptable battery life, such battery powered devices often spend a majority of their life time in a low power state. At strictly controlled times (e.g. every 4 minutes), the battery powered devices may wake up to wirelessly receive messages from another device and/or wirelessly send messages to other devices in a tightly synchronized manner. After processing the received messages, the battery powered devices typically return to the low power state in order to conserve battery power.

The amount of time that the battery powered devices remains awake, as well as the frequency of the wake periods, directly affects the battery life of the battery powered devices. Thus, to increase the battery life of the battery powered devices, it is desirable to reduce the amount of time that the battery powered devices remains awake during each wake period, and to increase the time the battery powered devices remain in the low power state between the synchronized wake periods. However, increasing the time that the battery powered devices remain in the low power state between the wake periods increases typically decreases the responsiveness of the system, which can be undesirable particularly when a user is interacting with the system. What would be desirable is a system that maintains or even extends the battery life of such battery powered wireless devices while increasing the apparent responsiveness of the system.

SUMMARY

The present disclosure generally relates to battery powered wireless devices, and more specifically to systems and methods for maintaining or even extends the battery life of such battery powered wireless devices while increasing the apparent responsiveness of the system. Generally, the battery powered wireless devices may wake up to listen for wireless messages more frequently during those periods in a day when a user is more likely to interact with the system, and may wake up to listen for wireless messages less frequently during those periods in a day when a user not likely to interact with the system. In some cases, the periods when a user is most likely to interact with the system and/or not likely to interact with the system may be learned based on prior user interactions.

In one example, a method for communicating between a first device and a second device of a building control system may include wirelessly communicating between the first device and the second device during scheduled communication times, wherein the second device is placed in a listening state during the scheduled communication times, and enters a non-listening state between at least some of the scheduled communication times. The method may further include receiving a plurality of user inputs each at a user interaction time, wherein each of the plurality of user inputs cause a corresponding communication between the first device and the second device, identifying one or more active periods of a day that user input is more likely to occur and one or more inactive periods of the day that user input is less likely to occur based at least in part of the user interaction times, and the second device may be maintained in the listening state more during active periods than during inactive periods. While using a building control system as an example, it is contemplated that such a method may be applied to any suitable system.

Alternatively, or in addition, the second device may be battery powered and the first device may be line powered.

Alternatively, or in addition, the second device may be part of a radiator valve and the first device may comprise a thermostat.

Alternatively, or in addition, the first device may be a master device and the second device may be a slave device.

Alternatively, or in addition, the first device may send, during a scheduled communication time, a message that notifies the second device of a next scheduled communication time, wherein the next scheduled communication time is scheduled to be sooner during active periods than during inactive periods.

Alternatively, or in addition, the one or more active periods and the one or more inactive periods may be identified over time by learning one or more patterns in the user interaction times.

In some cases, the method may further include maintaining a counter and a set point for each of a plurality of time periods for each of a plurality of days of a week, and initializing each of the counters to an initialization value. During the course of the week as time sequentially passes each of the plurality of time periods, the corresponding counter may decrement. The method may further include receiving a user input that specifies a set point at a user interaction time, identifying the time period that corresponds to the user interaction time, determine if the specified set point is different from the set point of the corresponding time period, and if so, setting the counter that corresponds to the corresponding time period to the initialization value, and identifying those time periods of the plurality of time periods that have higher counter values as active time periods and identifying those time periods that have lower counter values as inactive time periods.

In some cases, the method may further include clustering the user interaction times into a plurality of clusters, wherein each cluster may correspond to a corresponding cluster period, identifying each of the plurality of cluster periods as an active period, and identifying each of the times between the pluralities of cluster periods as an inactive period.

Alternatively, or in addition, a battery powered wireless device for use with a building control system may include: a battery, an antenna for receiving wireless communications, and a controller powered by the battery and operatively coupled to the antenna. The battery powered wireless device may further include a sensor operatively coupled to the controller. The controller may be configured to wirelessly receive messages during scheduled communication times, wherein the controller may enter a listening state during the scheduled communication time and enter a non-listening state between at least some of the scheduled communication times. The controller may further be configured to wirelessly communicate a value sensed by the sensor to the building control system during one or more of the scheduled communication times.

Alternatively, or in addition, the scheduled communication times may be based at least in part on an occupancy schedule programmed into the building control system.

Alternatively, or in addition, the scheduled communication times may be based at least in part of a geo-fence crossing event detected by the building control system.

Alternatively, or in addition, the controller may be configured to store a set point and may use that set point to control a radiator.

Alternatively, or in addition, the scheduled communication times may be communicated to the controller via the antenna.

In some cases, a building controller for use with a building control system may include: an antenna, a controller operatively coupled to the antenna, and a user interface. The controller may be configured wirelessly send messages to a remote building control device during future scheduled communication times, and the future scheduled communication times may be based at least in part of previous user interactions with the building control system, and at least some of the previous user interactions may be received via the user interface.

Alternatively, or in addition, at least some of the previous user interactions may be communicated to the controller form a remote location.

Alternatively, or in addition, the future scheduled communication times may be based at least in part on an identified pattern in the previous user interactions with the building control system.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various embodiments in connection with the accompanying figures, in which:

FIG. 3 is a schematic block diagram of an illustrative central controller of the building control system shown in FIG. 1;

FIG. 4 shows an illustrative method for communicating between a first device and a second device of a building control system;

FIG. 5 shows an illustrative method that may be used to determine when a user is most likely to interact with a building control system;

FIG. 8 shows an illustrative user interaction profile having scheduled occupancy periods.

Figure 1:
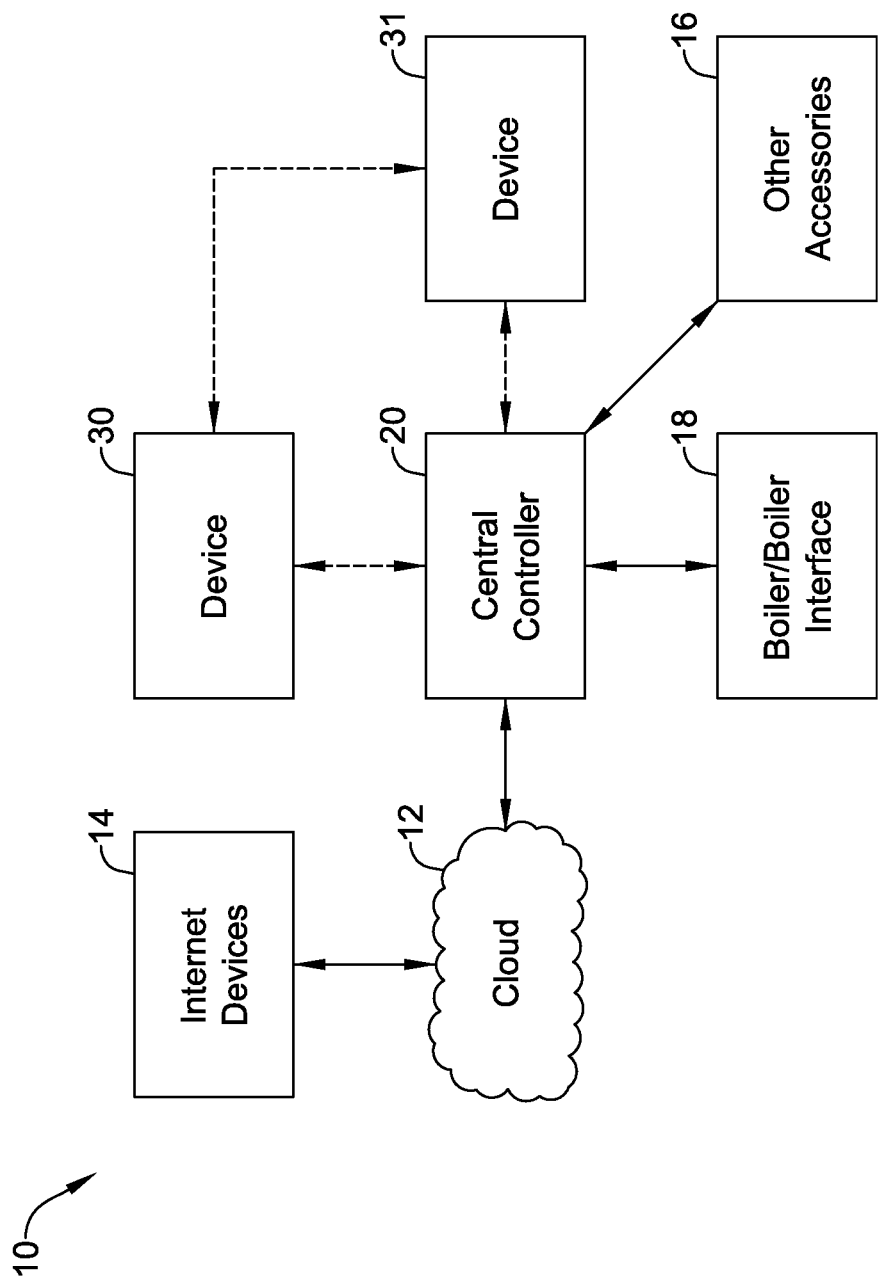
FIG. 1 is a schematic view of an illustrative building control system having a central controller in wireless communication with one or more remotely located wireless devices.

While the disclosure is amenable various modifications and alternative forms, specifics thereof have been shown by way of example in the drawing and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

The following description should be read with reference to the figures. The description and figures are meant to be illustrative in nature. While a building control system is used as an example, it is contemplated that the present disclosure may be applied to any suitable system. In some cases, the disclosure may be applied to wireless building controllers such as wireless thermostats, wireless zone controllers, wireless equipment interface modules, wireless sensors such as wireless temperature, humidity and other sensors, wireless security system controllers, wireless building control actuators such as wireless damper and valve actuators, and/or any other suitable wireless building control device, as desired. These are just examples.

FIG. 1 is a schematic view of an illustrative building control system 10 having a central controller 20 in wireless communication with one or more building components servicing a building. The building control system 10, as described herein according to the various illustrative embodiments, may be used to control environmental conditions in buildings such as, single family dwellings, multi-tenant buildings, retail stores, commercial offices, hospitals, restaurants, and/or any other suitable building or other structure. It will be generally understood that the building control system 10 of FIG. 1 may be expanded and adapted to control and manage other systems and building components, and may be deployed on a larger scale as the need arises. In addition, the building control system 10 may be configured to coordinate operational control of multiple building components service the building that otherwise operate independently of one another, such as HVAC, security and lighting. This may increase operational efficiency, reduce operational costs and maximize energy efficiency of the building in which the building control system 10 is deployed.

The illustrative building control system 10 shown in FIG. 1 includes one or more wireless devices 30, 31, a central controller 20, a boiler/boiler interface 18, and other accessories 16 (i.e., one or more discrete air conditioner units, one or more dampers, one or more lighting controllers, or any other suitable building components that may be used to service the building). It should be recognized that the boiler/boiler interface 18 may be any form of heating or cooling plant/plant interface. In a simplified embodiment, the building control system 10 may be used to communicate with a single wireless device 30 or 31. In other embodiments, the building control system 10 may be used to communicate with and control multiple wireless devices 30, 31 and/or multiple other accessories 16. The wireless devices 30, 31 may be located in different zones or rooms of the building and may be mounted, for example, on a wall, ceiling, or on a component it is designed to control and/or monitor. In the example shown, the wireless devices 30, 31 may be electronic thermostatic radiator valve (eTRV) controllers, configured to be mounted on a radiator valve and/or configured to be part of the radiator valve. The central controller 20 may send one or more commands to the electronic thermostatic radiator valve (eTRV) controllers to set the corresponding radiator valves to desired valve position. An actuator in each of the electronic thermostatic radiator valve (eTRV) controllers may then turn the corresponding radiator valve to the commanded position. While eTRV controllers are used as an example, it should be recognized that the wireless devices 30, 31 may include a damper actuator controlling an air damper in an air duct, a discrete air conditioner control unit, a user interface for accepting set points and/or other settings, and/or any other suitable wireless device as desired.

The central controller 20 may be configured to control the comfort level in one or more rooms and/or zones of the building by activating and/or deactivating the boiler/boiler interface 18 (e.g., any form of heating or cooling plant/plant interface), and/or the wireless devices 30, 31, and/or the other accessories 16 in a controlled manner. In some cases, the central controller 20 may be configured to transmit a command over a wired (as indicated by solid lines in FIG. 1) or wireless (as indicated by dashed lines in FIG. 1) network to the wireless devices 30, 31 and/or the other accessories 16. In some cases, a user may interact with a user interface on an internet device 14 (i.e., a phone, a tablet, a laptop, or any other suitable device), which may transmit a command, via a cloud 12, to the central controller 20. The central controller 20 may then transmit a command to the wireless devices 30, 31 and/or the other accessories 16. In this manner, the central controller 20 may assuming a master device role and communicate to a slave device (i.e., the wireless devices 30, 31). While shown in this example as a central controller 20, it is contemplated that the central controller 20 may be or may include a hub device, such as a router, or any other suitable device.

The central controller 20 may be configured to wirelessly communicate over a wireless network using one or more wireless communication protocols such as cellular communication, ZigBee, REDLINK™, Bluetooth, Wi-Fi, IrDA, infra-red, radio frequency (RF), dedicated short range communication (DSRC), EnOcean, and/or any other suitable common or proprietary wireless protocol, as desired. In some cases, the wireless network may be an ad-hoc wireless network. In other cases, the wireless network may be a wireless mesh network such as a ZigBee wireless mesh network. In addition, the wireless network may include one or more routers (not shown in FIG. 1) to extend and expand communication at the network level, but this is not required.

In some instances, a user interface may be provided as part of the central controller 20, part of one or more of the wireless devices 30, 31, and/or provided as part of a separate device such as one or more of the internet devices 14. The user interface may be used to facilitate a user's interactions with the building control system 10, such as to set a mode of the building control system 10 (e.g. heat, cool, off) and/or to set one or more parameters of the building control system (e.g. set point, schedule, etc.).

Figure 2:
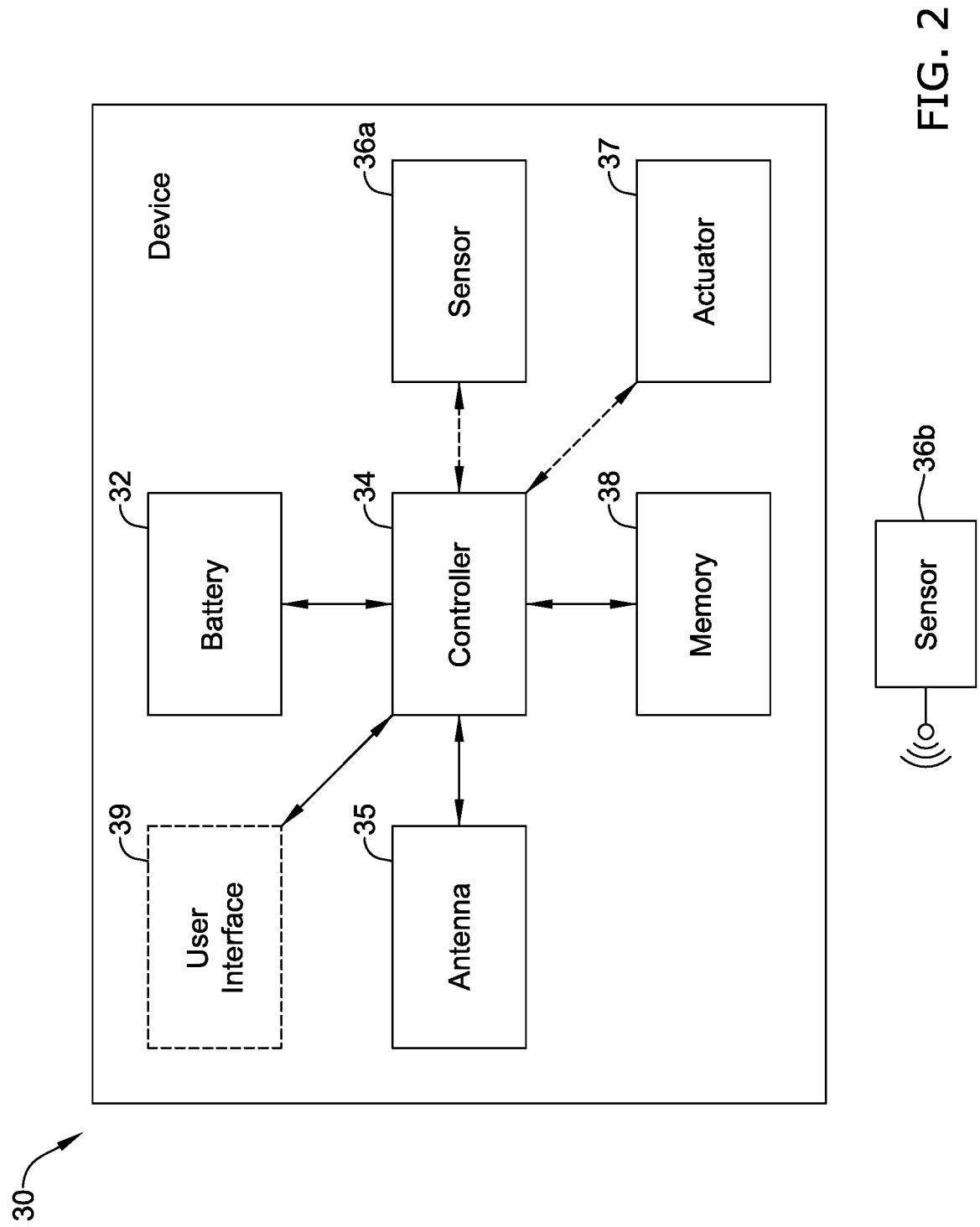
FIG. 2 is a schematic block diagram of an illustrative remotely located wireless device of the building control system shown in FIG. 1.

FIG. 2 is a schematic block diagram of an illustrative remotely located wireless device 30 of the building control system shown in FIG. 1. In the example shown, the wireless device 30 may operate on battery power and, as such may implement various algorithms to help conserve battery power when possible. As discussed above, the wireless device 30 may be an eTRV controller, but this is not required. In the example shown, the wireless device 30 may include a battery 32, which may be rechargeable or replaceable. In general, it is desirable to lengthen the time between recharging and/or replacing the battery 32 of the wireless device 30. The wireless device 30 may also include an optional sensor 36a that senses one or more conditions in or around the wireless device 30, an optional actuator 37, a wireless antenna 35 for wirelessly sending and/or receiving messages to and/or from a remotely located device (i.e., the central controller 20 or another wireless device 31), and a memory 38 for storing one or more parameter values. In some cases, the wireless device 30 may also include a user interface 39 for interacting with a user.

When provided, the sensor 36a may be a temperature sensor, a humidity sensor, a pressure sensor, a flow sensor, a motion sensor, an occupancy sensor, a contact sensor, a light sensor, and/or any other suitable sensor. In some cases, the optional sensor 36a may be integrated with and form part of the wireless device 30. In other cases, the sensor may be provided as a separate component, as indicated by sensor 36b and wirelessly coupled to the wireless device 30. In still other instances, some sensors 36b may be separate components while other sensors 36a may be integrated with the wireless device 30. These are just some example configurations.

In some cases, the wireless device 30 may use the sensors 36a and/or 36b to sense an ambient condition (e.g., temperature, humidity, etc.) in or around the wireless device 30. The central controller 20 may be configured to receive the sensed conditions from the wireless device 30 via wireless communication. In some instances, the central controller 20 may be configured to use the sensed conditions (i.e., signals received from the sensors 36a, 36b) to operate or coordinate operation of the wireless devices 30, 31, the boiler/boiler interface 18 (e.g., any form of heating or cooling plant/plant interface), and/or the other accessories 16 (not shown in FIG. 2). In one example, the wireless device 30 may use the wireless antenna 35 for wirelessly sending and/or receiving messages to/from the central controller 20 (as shown in FIG. 1). Alternatively, or in addition, the wireless device 30 may wirelessly send and/or receive messages via the antenna 35 to/from another wireless device (i.e., wireless device 31) and/or to/from the internet devices 14.

The illustrative wireless device 30 of FIG. 2 includes a controller 34. In the example shown, the controller 34 communicates with the battery 32, the sensor 36a and/or 36b, the antenna 35, the actuator 37, and the memory 38. With regard to the battery 32, the controller 34 may receive power from, and in some cases, monitor the current flowing from the battery 32 and/or the voltage provided by the battery 32. In some cases, the controller 34 may be programmed to operate differently depending on the amount of battery life that remains in the battery 32. With regard to the sensor 36a and/or 36b, the controller 34 may poll the sensor 36a, 36b at a particular time/rate and may receive a reading from the sensor 36a, 36b. With regard to the antenna 35, the controller 34 may receive and interpret messages that arrive through the antenna 35, and may compose and transmit messages and/or commands via the antenna 35. With regard to the actuator 37, the controller may send control signals to the actuator 37 to drive, for example, a radiator valve (and/or any other suitable wireless device) to a commanded position. With regard to the memory 38, the controller 34 may store and retrieve particular parameter values, algorithms, and other data as needed or desired. The memory 38 may be any suitable type of storage device including, but not limited to, RAM, ROM, EPROM, flash memory, a hard drive, and/or the like.

To conserve battery power, the controller 34 may be configured to wirelessly receive messages during scheduled communication times, and switch the wireless device 30 into a low power sleep mode between communication times. In some instances, the controller 34 may be configured to receive one or more commands and/or parameter setting messages from the central controller 20 and/or another wireless device (i.e., wireless device 31, or other suitable wireless device) via the antenna 35 during the communication times. The one or more commands and/or parameter setting messages may provide one or more parameter values, such as a temperature set point, for example, which may be stored in the memory 38. The controller 34 of the wireless device 30 may use the stored temperature set point along with a sensed condition (e.g. temperature) to control an actuator of the wireless device 30 (i.e., the eTRV).

In some cases, the central controller 20 may send a message to the wireless device 30 during a communication time of the wireless device 30. The message may include a synchronization signal along with time duration until the next communication time referenced to the synchronization signal. The controller 34 may start a timer in response to the synchronization signal, and then enter a low power sleep mode. When the time duration specified in the previous message has expired, the controller 34 may wake up the wireless device 30 from the low power sleep mode and again enter the communication period for a brief period of time to listen for another message from the central controller 20 and/or communicate a message to the central controller 20. Increasing the time between the communication times, and thus increasing the time that the wireless device 30 remains in the lower power sleep mode, tends to increase the battery life of the wireless device 30. However, it has the effect of decreasing the responsiveness of the system. To alleviate this apparent tension, the wireless device 30 may be configured to wake up and communicate more frequently during those periods in a day when a user is more likely to interact with the system, and may wake up and communicate less frequently during those periods in a day when a user is not likely to interact with the system. In some cases, the periods when a user is most likely to interact with the system and/or not likely to interact with the system may be learned based on prior user interactions.

A pattern of prior user interactions with the building control system 10 may be stored in the memory 38 of the wireless device 30 and/or in the central controller 20. Stored user interactions can be used to learn those periods of a day during which a user is more likely to interact with the wireless device 30 and/or the building control system 10. During those periods, the wireless device 30 may enter a communication period more frequently. For example, during periods where user interaction is more likely to occur (e.g. 6 AM-9 AM), the wireless device 30 may repeatedly wake up for a short communication period (e.g. ten (10) milliseconds) every ten (10) seconds, and remain in the lower power sleep state between communication periods. This may provide adequate responsiveness to the user. During periods in the day at which a user is not likely to interact with the wireless device 30 and/or the building control system 10, the wireless device 30 may enter a communication period far less frequently. For example, during periods where user interaction is not likely to occur (e.g. 1 AM-6 AM), the wireless device 30 may repeatedly wake up for a short communication period (e.g. one hundred (100) milliseconds) every four (4) minutes, and remain in the lower power sleep state between communication periods. This may help increase the life of the battery of the wireless device 30. In some cases, the periods of a day where user interaction is more likely to occur and/or the periods where user activity is not likely to occur may be programmed by the user. In other cases, the periods of a day where user interaction is more likely to occur and/or the periods where user activity is not likely to occur may be learned by the system based on prior user interactions.

FIG. 3 is a schematic block diagram of an illustrative central controller 20 of the building control system 10 shown in FIG. 1. As shown in FIG. 3, the central controller 20 may include an antenna 22 for transmitting and/or receiving signals over a wireless network. In some instances, antenna 22 can be a wireless communications port for wirelessly sending and/or receiving messages over the wireless network. In one example, the antenna 22 may include a low frequency radio frequency (RF) transceiver for transmitting and/or receiving RF signals over a Redlink™ network, but this is just one example. More generally, the central controller 20 may include a suitable transceiver for communicating with the wireless devices 30, 31 over any suitable communications path. In some cases, the central controller 20 may communicate with one or more remote temperature sensors, humidity sensors, lighting sensors, and/or occupancy sensors, which may be located throughout the building, via the antenna 22. In some cases, the central controller 20 may communicate with a temperature sensor and/or humidity sensor located outside of the building or structure for sensing an outdoor temperature and/or humidity, if desired. The central controller 20 may further include a processor (e.g. microprocessor, microcontroller, etc.) 27 and a memory 26. The memory 26 may be any suitable type of storage device including, but not limited to, RAM, ROM, EPROM, flash memory, a hard drive, and/or the like. In some cases, the central controller 20 may also include a user interface 24, sometimes with a display (not shown).

The central controller 20 may send a message to the wireless device 30 during a communication time of the wireless device 30. In some cases, the message may include a synchronization signal along with time duration until the next communication time referenced to the synchronization signal. The wireless device 30 may start a timer in response to the synchronization signal, and then subsequently enter a low power sleep mode to conserve battery power. When the time duration specified in the previous message has expired, the wireless device 30 may wake up from the low power sleep mode and listen for another message from the central controller 20 and/or communicate a message to the central controller 20. Increasing the time between these communication times, and thus increasing the time that the wireless device 30 remains in the lower power sleep mode, tends to increase the battery life of the wireless device 30. However, it has the effect of decreasing the responsiveness of the system.

To alleviate this apparent tension, the central controller 20 may detect a current user interaction and/or may learn when a user interaction is likely to occur, and during these times, may include in the next message to the wireless device 30 a shortened time duration referenced to the synchronization signal. Then, when the shortened time duration specified in the message has expired, the wireless device 30 may wake up from the low power sleep mode and listen for another message from the central controller 20 and/or communicate a message to the central controller 20. This may increase the apparent responsiveness of the system. This may continue for a period of time after no further user interaction is detected and/or until further user interaction is no longer likely to occur. Then, the central controller 20 may send messages that include a lengthened time duration referenced to the synchronization signal. When the lengthened time duration specified in the message has expired, the wireless device 30 may wake up from the low power sleep mode and listen for another message from the central controller 20 and/or communicate a message to the central controller 20. This may increase the battery life of the wireless device 30. More generally, it is contemplated that the wireless device 30 may be configured to wake up and communicate more frequently during those periods in a day when a user is more likely to interact with the system, and may wake up and communicate less frequently during those periods in a day when a user is not likely to interact with the system. In some cases, the periods when a user is most likely to interact with the system and/or not likely to interact with the system may be learned based on prior user interactions.

In some cases, a pattern of prior user interactions with the building control system 10 may be stored in the memory of the wireless device 30 and/or the central controller 20. Stored user interactions can be used to learn those periods of a day during which a user is more likely to interact with the wireless device 30 and/or the central controller 20. During those periods, the wireless device 30 may wake up and enter a communication mode more frequently. For example, during periods where user interaction is more likely to occur (e.g. 6 AM-9 AM), the wireless device 30 may repeatedly wake up for a short communication period (e.g. ten (10) milliseconds) every ten (10) seconds, and remain in the lower power sleep state between communication periods. This may provide adequate responsiveness to the user. During periods in the day at which a user is not likely to interact with the wireless device 30 and/or the central controller 20, the wireless device 30 may enter a communication mode far less frequently. For example, during periods where user interaction is not likely to occur (e.g. 1 AM-6 AM), the wireless device 30 may repeatedly wake up for a short communication period (e.g. one hundred (100) milliseconds) every four (4) minutes, and remain in the lower power sleep state between communication periods. This may help increase the life of the battery of the wireless device 30. In some cases, the periods of a day where user interaction is more likely to occur and/or the periods where user activity is not likely to occur may be programmed by the user. The user may program an interaction schedule via the user interface 24. In other cases, the periods of a day where user interaction is more likely to occur and/or the periods where user activity is not likely to occur may be learned by the system based on prior user interactions.

FIG. 4 shows an illustrative method 400 for communicating between a first device and a second device of a building control system 10. The first device and/or the second device may be one of central controller 20, wireless device 30, wireless device 31, one of the other accessories 16, a thermostat, a radiator valve, a damper actuator, a temperature sensor, a humidity sensor, and/or any other suitable device. The illustrative method 400 includes wirelessly communicating between the first device and the second device during scheduled communication times, as shown at 410. During the scheduled communication times, the second device may be placed in a listening state, where the second device enters a non-listening state between at least some of the scheduled communication times, as shown at 420. The method may further include receiving a plurality of user inputs each at a user interaction time, wherein each of the plurality of user inputs cause a corresponding communication between the first device and the second device, as shown at 430. The plurality of user inputs may be stored in a memory of the first device and/or the second device. Based on the stored user inputs, the method may include identifying one or more active periods of a day that user input is more likely to occur, and one or more inactive periods of the day that user input is less likely to occur, based at least on part on the user interaction times, as shown at 440. During active periods, the second device is maintained in the listening state more than during inactive periods 450 to increases the responsiveness of the building control system. In some cases, the first device (e.g., a master device) sends a message during a scheduled communication time that notifies the second device (e.g. a slave device) of a next scheduled communication time. The next scheduled communication time may be scheduled to be sooner during active periods than during inactive periods.

The one or more active periods and the one or more inactive periods may be identified over time by learning one or more patterns in the user interaction times. For example, as illustrated in FIG. 5, user interaction time periods can be established by developing an interaction profile 500 that may include, for example, a table with each of seven (7) columns representing one of the days of the week, and each row representing a time period during each day. In some cases, each day may be divided into eight (8) time periods, with each time period representing a three (3) hour time window. In this example, a counter may be maintained for each of the eight (8) time periods of each of the seven (7) days of the week, as shown.

On power up, each counter may be initialized to a default value such as seven (7). During the course of a week, as time passes, each time period is reached sequentially, and the corresponding counter is decremented by one (1). In other words, on Sunday at 6:00 am the counter initially has a value of seven (7). If a user does not interact with the system (e.g. change a set point) at any time during that three (3) hour window, the corresponding counter would be decrement by one (1) and become a six (6). Thus, on the following Sunday (one week later), the counter will have a value of (6). So long as the user does not interact with the system at any time during that three (3) hour time window on subsequent Sundays, this would continue week-by-week until the corresponding counter reaches a value of zero (0). However, if a user interacts with the building control system 10 during the Sunday 6:00 am-8:59 am time period, the counter may be reset back to seven (7). Thus, in the shown in FIG. 5, the counter that corresponds to the Sunday 6:00 am-8:59 am time period is reset to an active time window when a user interaction is detected, and then declines over the coming weeks to zero when no further user interactions are detected on subsequent Sundays during this time period. The counter values for each of the other time periods may be maintained in a similar manner.

During operation, and with reference to the illustrative building control system 10 of FIG. 1, the wireless device 30 (and/or central controller 20) may wake up and communicate more frequently during those time periods that have a counter value of seven (7), and may wake up and communicate less frequently during those periods that have a counter value of zero (0). In some cases, a counter threshold value may be provided, wherein for those time periods that have a counter value that is above the threshold value, the wireless device 30 (and/or central controller 20) may wake up and communicate more frequently thereby increasing the apparent responsiveness, and for all time periods that have a counter value below the threshold value, the wireless device 30 (and/or central controller 20) may wake up and communicate less frequently thereby increasing the battery life of the wireless device. In some cases, the threshold value may be set to 3, 4, 5 or any other suitable threshold value.

Figure 6:
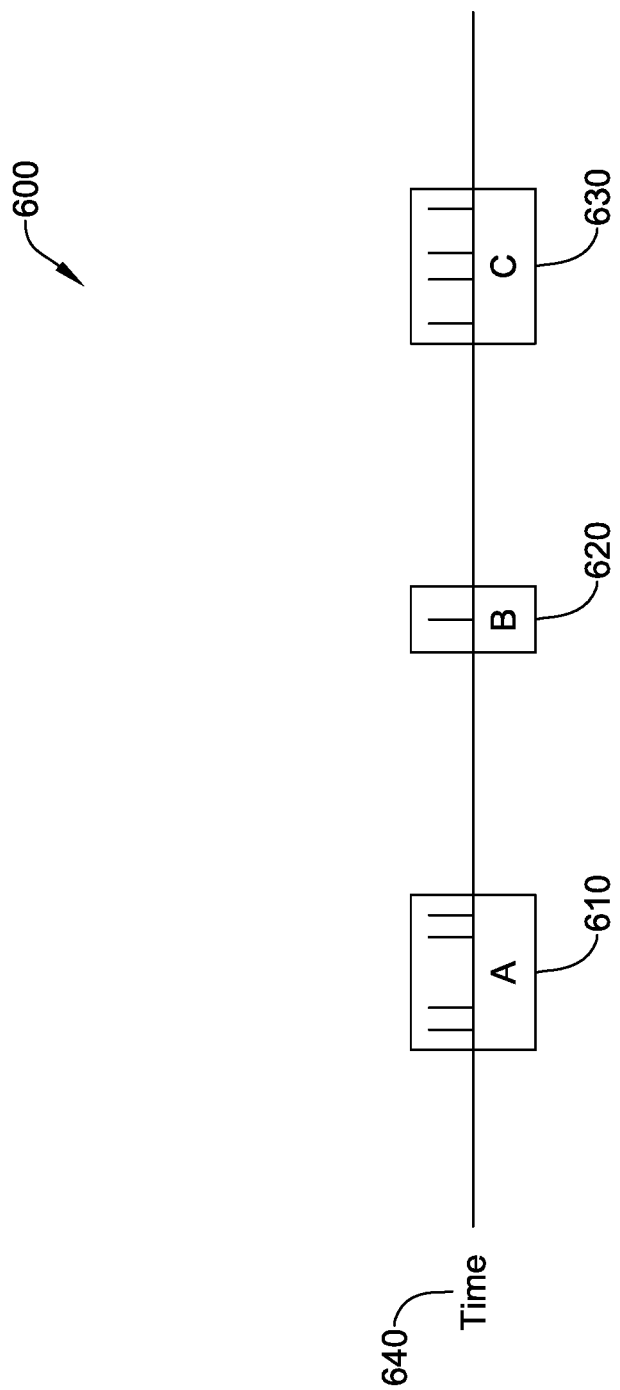
FIG. 6 shows another illustrative method to determine when a user is more likely to interact with a building control system.

FIG. 6 shows another illustrative method 600 to determine when a user is more likely to interact with a building control system. As illustrated in FIG. 6, user interaction times may be monitored over time (a day, week or longer) and stored in a user interaction log. The user interaction log may be analyzed to identify clusters of user interactions. For example, a cluster may identified by starting a timer when a first user interaction is detected. If another user interaction is detected before the time expires, the timer is reset. This is continued until no user interaction is detected and the timer expires. Then all user interactions from the first user interaction until the time expires are grouped together in a cluster. For example, in FIG. 6, cluster A 610 includes four (4) user interactions, cluster B 620 includes one (1) user interaction, and cluster C 630 includes four user interactions. The timer may be reset to 3 hours, 2 hours, 1 hour or any other suitable time period. The clusters may occur at particular times of a day or week. For example, cluster A 610 may have occurred on Monday at 6:00 am-7:35 am, cluster B 620 at Thursday at 5:05 pm-6:05 pm and cluster C 630 at Saturday at 12:05 pm-4:10 pm. These cluster periods may be applied going forward to future weeks to identify periods that user interaction is more likely to occur. In some cases, if a user interaction does not occur during a subsequent cluster period during each of two or more subsequent weeks, the cluster may be removed. Also, future interactions may cause new clusters may be added.

During operation, and with reference to the illustrative building control system 10 of FIG. 1, the wireless device 30 (and/or central controller 20) may wake up and communicate more frequently during those time periods during a day or week that correspond to each of the clusters, and may wake up and communicate less frequently during those periods between clusters. For example, the wireless device 30 (and/or central controller 20) may wake up and communicate more frequently on Mondays at 6:00 am-7:35 am, which corresponds to cluster A 610, on Thursday at 5:05 pm-6:05 pm, which corresponds to cluster B 620, and on Saturday at 12:05 pm-4:10 pm, which corresponds to cluster C 630. The wireless device 30 (and/or central controller 20) may wake up and communicate less frequently during those times between cluster A 610, cluster B 620 and cluster C 630. In some cases, if a user interaction does not occur on Mondays at 6:00 am-7:35 am (cluster A 610) for two or more subsequent weeks, cluster A 610 may be removed. If a user interaction is detected at other times in the future, new clusters may be added. In this manner, the central controller 20 and/or the wireless device 30 may "learn" periods when a user is most likely to interact with the system and/or not likely to interact with the system may be learned, based on prior user interactions.

Figure 7:
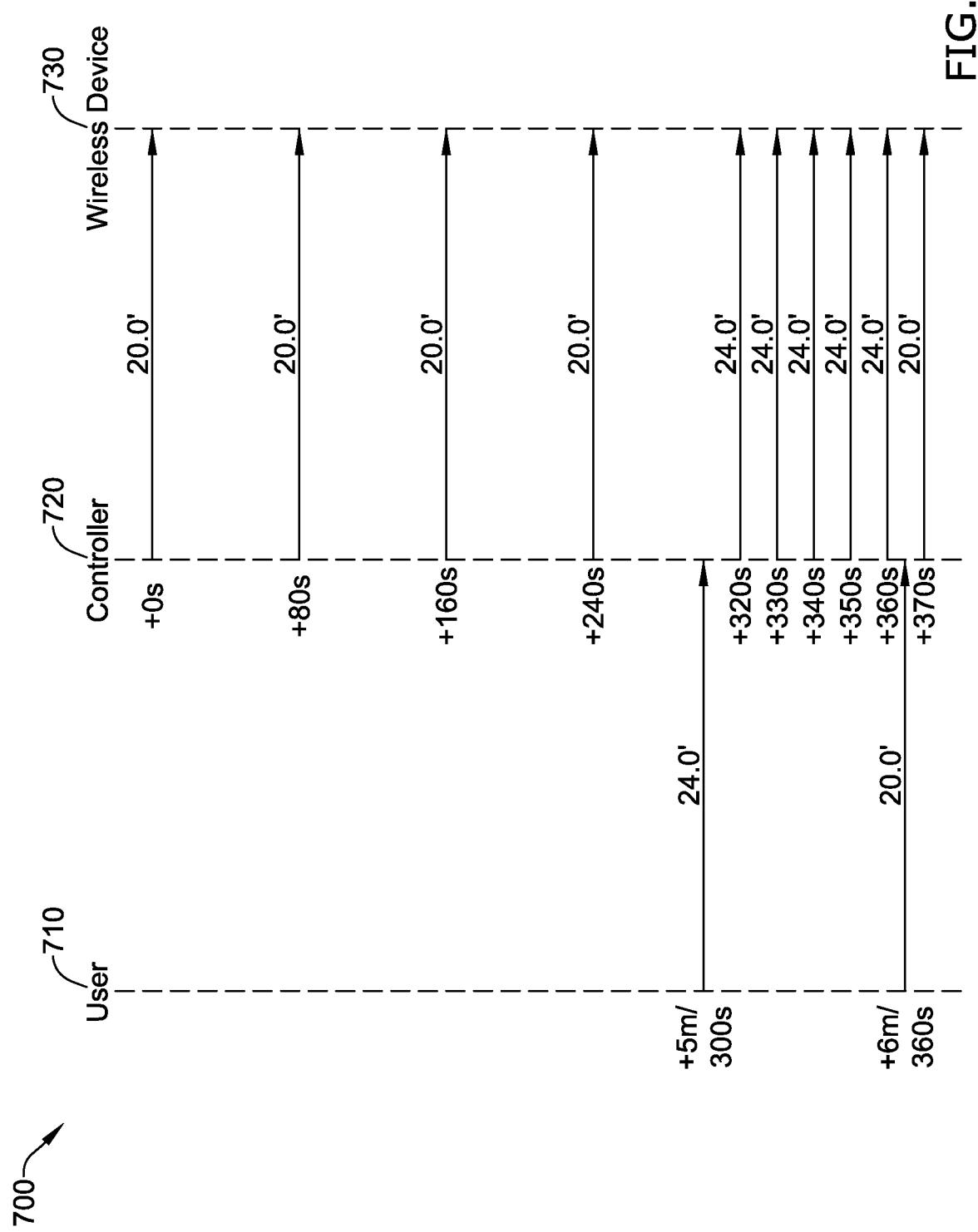
FIG. 7 is timing diagram of the operation of an illustrative building control system.

FIG. 7 is timing diagram 700 of the operation of another illustrative building control system. As shown, a controller 720 may employ a set point of twenty (20) degrees Celsius. Initially, the wireless device 730 may wake up to communicate with the controller 720 less frequently to conserve battery power of the wireless device 730. In the example shown, the wireless device 730 may wake up to receive an updated set point from the controller 720 every eighty (80) seconds, namely at 0, 80, 160, 240 and 320 seconds. At 300 seconds, a user interaction with the controller 720 is detected that changes the set point to twenty-four (24) degrees Celsius. The new set point is not immediately relayed from the controller 720 to the wireless device 730 until twenty (20) seconds later (i.e. at 320 seconds), as the wireless device 730 is currently set to listen every eighty (80) seconds to conserve battery power. At three hundred twenty (320) seconds, the wireless device 730 wakes up and the controller 720 sends a message that includes the updated set point of twenty-four (24) degrees Celsius, a synchronization signal along with a shortened time duration until the next communication time referenced to the synchronization signal. In this example, the shortened time duration is ten (10) seconds. As can be seen, the user interaction 710 at 300 seconds causes the controller 720 and the wireless device 730 to communicate on a more frequent basis to increase the responsiveness of the system. In some cases, this may continue for a pre-set time period and then switch back to communicating on a less frequent basis to conserve battery power, where the pre-set time may be, for example, three (3) hours, one (1) hour, thirty (30) minutes, sixty (60) minutes, forty (40) minutes, or any other suitable time period. In other cases, this may continue for a time period that is based on prior user interactions, such as a distribution of prior user interactions over time.

Continuing with the example of FIG. 7, at 360 seconds, a user interaction with the controller 720 is detected that changes the set point back to twenty (20) degrees Celsius. This updated set point is relayed to the wireless device 730 the next time the wireless device wakes up, or in this case at 360 seconds. As can be seen, this may significantly increase the responsiveness of the system.

FIG. 8 shows an illustrative user interaction profile having scheduled occupancy periods. An example interaction profile 800 may include scheduled occupancy times. The scheduled occupancy times may be based on a programmable operating schedule which may include two or more time periods for each of two or more days. In some cases, the time periods may correspond to the time periods of a temperature schedule, where each time period has a corresponding temperature set point, but this is not required.

The building control system 10 may be configured to wake up and communicate more frequently when the user is expected to be home and not sleeping (Home "H" periods), and may be configured to wake up and communicate less frequently when the user is expected to be sleeping (Sleep "S" periods) or is away, such as at work (Work "W" periods). In the example shown, the building control system 10 may be configured to wake up and communicate every ten (10) seconds when the user is expected to be home and not sleeping (Home "H" periods) as shown at 810, and may be configured to wake up and communicate every four (4) minutes when the user is expected to be sleeping (Sleep "S" periods) as shown at 820 or is away, such as at work (Work "W" periods) as shown at 830. In some cases, the schedule periods may be programmed by the user. In other cases, the schedule periods may be set based at least in part on detected prior user behavior.

Figure 9:
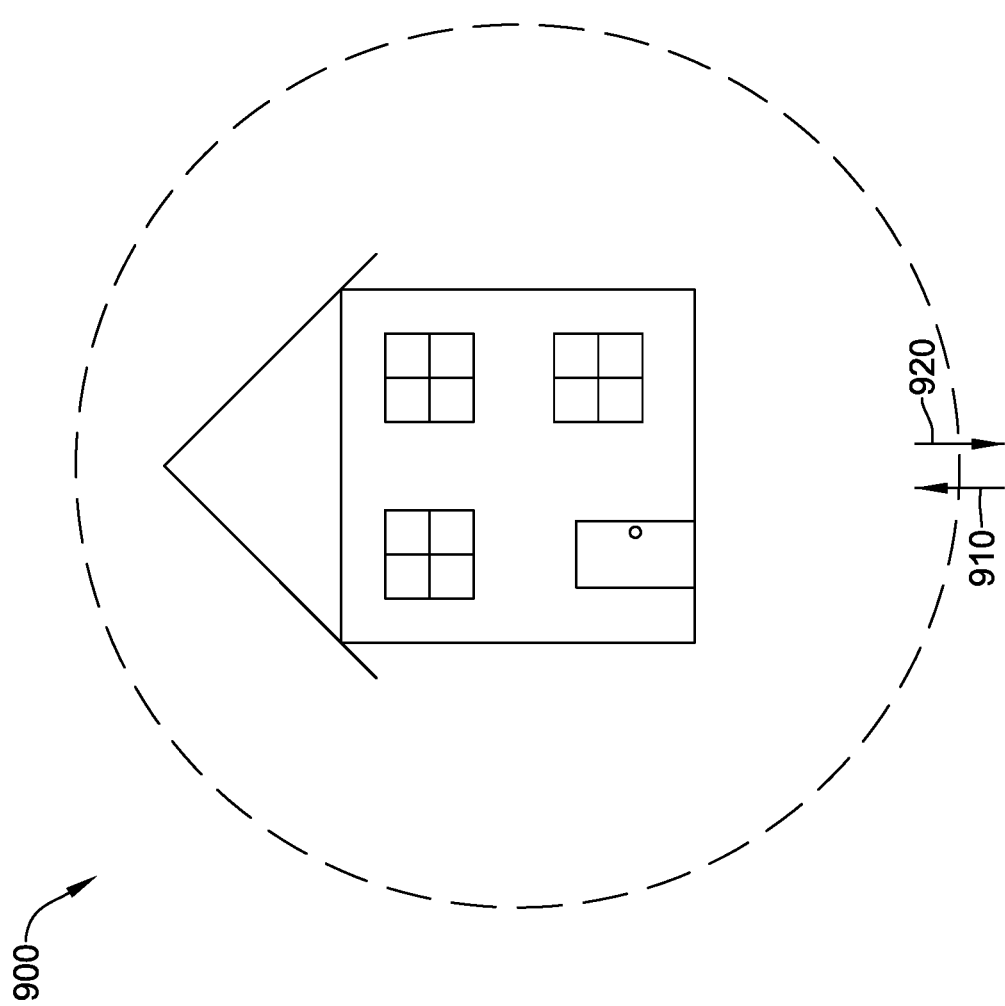
FIG. 9 shows an illustrative geo-fence crossing event which may be used by the building control system to identify times when a remotely located wireless device may wake up to listen for wireless messages less frequently.

FIG. 9 shows an illustrative geo-fence crossing event 900 which may be used by the building control system 10 to identify when a building is expected to be occupied and unoccupied. When the building is expected to be occupied, the building control system 10 may be configured to wake up and communicate more frequently to increase the responsiveness of the system. When the building is expected to be unoccupied, the building control system 10 may be configured to wake up and communicate less frequently to conserve battery power.

A user of the building may have a mobile device with location services. The mobile device and/or the building control system 10 may store a geo-fence associated with the building, and provide geo-fence functionality that identifies when the mobile device crosses the geo-fence, as indicated by arrows 910 crossing-into the geofence and 920 crossing-out of the geo-fence, resulting in corresponding geo-fence crossing events. The building control system 10 may include a memory that is configured to store a log of the detected geo-fence crossing events. For each geo-fence crossing event, the log may include an indication of the geo-fence crossing event as well as whether the geo-fence crossing event was a crossing-in event or a crossing-out event. When the user is determined to be inside the geo-fence, the building may be considered to be occupied, and the building control system 10 may be configured to wake up and communicate more frequently to increase the responsiveness of the system. When the user is determined to be outside the geo-fence, the building may be considered to be unoccupied, the building control system 10 may be configured to wake up and communicate less frequently to conserve battery power. This is just one example. This embodiment may be used in conjunction with the programmed schedule of FIG. 8, where the schedule is over-ridden (even when in the "H" periods) when the user is determined to be outside the geo-fence, and the building control system 10 may wake up and communicate less frequently to conserve battery power. When the user is determined to be inside the geo-fence, and the schedule of FIG. 8 may be followed.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for communicating between a first device and a second device of a building control system, the method comprising:
   wirelessly communicating between the first device and the second device during scheduled communication times, wherein the second device is placed in a listening state during the scheduled communication times and enters a non-listening state between at least some of the scheduled communication times;
   receiving a plurality of user inputs each at a user interaction time, wherein each of the plurality of user inputs cause a corresponding communication between the first device and the second device;
   identifying one or more active periods of a day that user input is more likely to occur and one or more inactive periods of the day that user input is less likely to occur based at least on part on the user interaction times; and
   the second device is maintained in the listening state more during active periods than during inactive periods.

2. The method of claim 1, wherein the second device is battery powered.

3. The method of claim 2, wherein the first device is line powered.

4. The method of claim 2, wherein the second device is part of a radiator valve controller.

5. The method of claim 1, wherein the first device comprises a thermostat.

6. The method of claim 1, wherein the first device is a master device and the second device is a slave device.

7. The method of claim 1, wherein the first device sends, during a scheduled communication time, a message that notifies the second device of a next scheduled communication time, wherein the next scheduled communication time is scheduled to be sooner during active periods than during inactive periods.

8. The method of claim 1, wherein the one or more active periods and the one or more inactive periods are identified over time by learning one or more patterns in the user interaction times.

9. The method of claim 1, further comprises:
   maintaining a counter and a set point for each of a plurality of time periods for each of a plurality of days of a week;
   initializing each of the counters to an initialization value;
   during the course of the week as time sequentially passes each of the plurality of time periods, decrementing the corresponding counter;
   receiving a user input that specifies a set point at a user interaction time;
   identifying the time period that corresponds to the user interaction time, determine if the specified set point is different from the set point of the corresponding time period, and if so, setting the counter that corresponds to the corresponding time period to the initialization value; and
   identifying those time periods of the plurality of time periods that have higher counter values as active time periods and identifying those time periods that have lower counter values as inactive time periods.

10. The method of claim 1, further comprises:
    clustering the user interaction times into a plurality of clusters, wherein each cluster corresponds to a corresponding cluster period;
    identifying each of the plurality of cluster periods as an active period; and
    identifying each of the times between the plurality of cluster periods as an inactive period.

11. A battery powered wireless device for use with a building control system, the battery powered wireless device comprising:
    a battery;
    an antenna for receiving wireless communications;
    a controller powered by the battery and operatively coupled to the antenna, the controller configured to:
       wirelessly receive messages during scheduled communication times, wherein the controller enters a listening state during the scheduled communication times and enters a non-listening state between at least some of the scheduled communication times; and
       wherein the scheduled communication times are based at least in part on a pattern of previous user interactions with the building control system.

12. The battery powered wireless device of claim 11, wherein the scheduled communication times are based at least in part on an occupancy scheduled programmed into the building control system.

13. The battery powered wireless device of claim 11, wherein the scheduled communication times are based at least in part on a geo-fence crossing event detected by the building control system.

14. The battery powered wireless device of claim 11, wherein the controller is configured to store a set point, and use the set point to control a radiator.

15. The battery powered wireless device of claim 11, further comprises a sensor operatively coupled to the controller, wherein the controller is configured to wirelessly communicate a value sensed by the sensor to the building control system during one or more of the scheduled communication times.

16. The battery powered wireless device of claim 11, wherein the scheduled communication times are communicated to the controller via the antenna.

17. A building controller for use in a building control system, the building controller comprising:

an antenna for transmitting wireless communications;

a controller operatively coupled to the antenna, the controller configured to:

wirelessly send messages to a remote building control device during future scheduled communication times; and wherein the future scheduled communication times are based at least in part on previous user interactions with the building control system.

18. The building controller of claim 17, further comprises a user interface, wherein at least some of the previous user interactions are received via the user interface.

19. The building controller of claim 17, wherein at least some of the previous user interactions are communicated to the controller from a remote location.

20. The building controller of claim 17, wherein the future scheduled communication times are based at least in part on an identified pattern in the previous user interactions with the building control system.

* * * * *